US008864035B2

United States Patent
Fukuba

(10) Patent No.: US 8,864,035 B2
(45) Date of Patent: Oct. 21, 2014

(54) OPTICAL INFORMATION READER AND OPTICAL INFORMATION READING METHOD

(75) Inventor: Ken Fukuba, Saitama (JP)

(73) Assignee: Optoelectronics Co., Ltd. (JP)

( * ) Notice: Subject to any disclaimer, the term of this patent is extended or adjusted under 35 U.S.C. 154(b) by 368 days.

(21) Appl. No.: 13/362,449

(22) Filed: Jan. 31, 2012

(65) Prior Publication Data

US 2012/0199655 A1      Aug. 9, 2012

Related U.S. Application Data

(63) Continuation of application No. PCT/JP2010/062852, filed on Jul. 29, 2010.

(30) Foreign Application Priority Data

Jul. 31, 2009   (JP) ................... 2009-180145

(51) Int. Cl.
| | |
|---|---|
| G06K 19/00 | (2006.01) |
| G06K 7/10 | (2006.01) |
| G02B 26/00 | (2006.01) |
| G02B 3/14 | (2006.01) |

(52) U.S. Cl.
CPC .......... G02B 26/005 (2013.01); G06K 7/10732 (2013.01); G06K 7/10811 (2013.01); G02B 3/14 (2013.01); G06K 7/10861 (2013.01)
USPC ...... 235/462.13; 235/435; 235/439; 235/454; 235/462.01

(58) Field of Classification Search
USPC ....................................................... 235/462
See application file for complete search history.

(56) References Cited

U.S. PATENT DOCUMENTS

| | | | |
|---|---|---|---|
| 5,378,883 A | 1/1995 | Batterman et al. | |
| 6,122,112 A | 9/2000 | Oono et al. | |
| 2006/0113386 A1* | 6/2006 | Olmstead | 235/454 |
| 2009/0084855 A1* | 4/2009 | Herwig | 235/462.41 |

FOREIGN PATENT DOCUMENTS

| | | |
|---|---|---|
| JP | 01129360 | 5/1989 |
| JP | 04338884 | 11/1992 |
| JP | 05217013 | 8/1993 |
| JP | 10020245 | 1/1998 |
| JP | 11030740 | 2/1999 |
| JP | 2002230477 | 8/2002 |
| JP | 2004110668 | 4/2004 |
| JP | 2005182518 | 7/2005 |
| JP | 2006197393 | 7/2006 |

OTHER PUBLICATIONS

International Search Report, dated: Oct. 19, 2010 of International Application No. PCT/JP2010/062852, filed: Jul. 29, 2010.

* cited by examiner

*Primary Examiner* — Matthew Mikels
(74) *Attorney, Agent, or Firm* — Kaplan Breyer Schwarz & Ottesen, LLP

(57) ABSTRACT

A decoder 20 of a code scanner 1 measures a distance to a baggage 4 based on a reflection light by the baggage 4 of a laser light 15a outputted by a laser light generator 15, which is detected by a CMOS image sensor 13, adjusts focus of a focus lens 11 and irradiation light amount of illumination by a pulse LED 14 at image pickup based on the measured distance, analyzes the image including a code symbol 5 on the baggage 4 whose image is picked up under conditions after the adjustments, and decodes information indicated by the code symbol.

24 Claims, 10 Drawing Sheets

F I G. 6
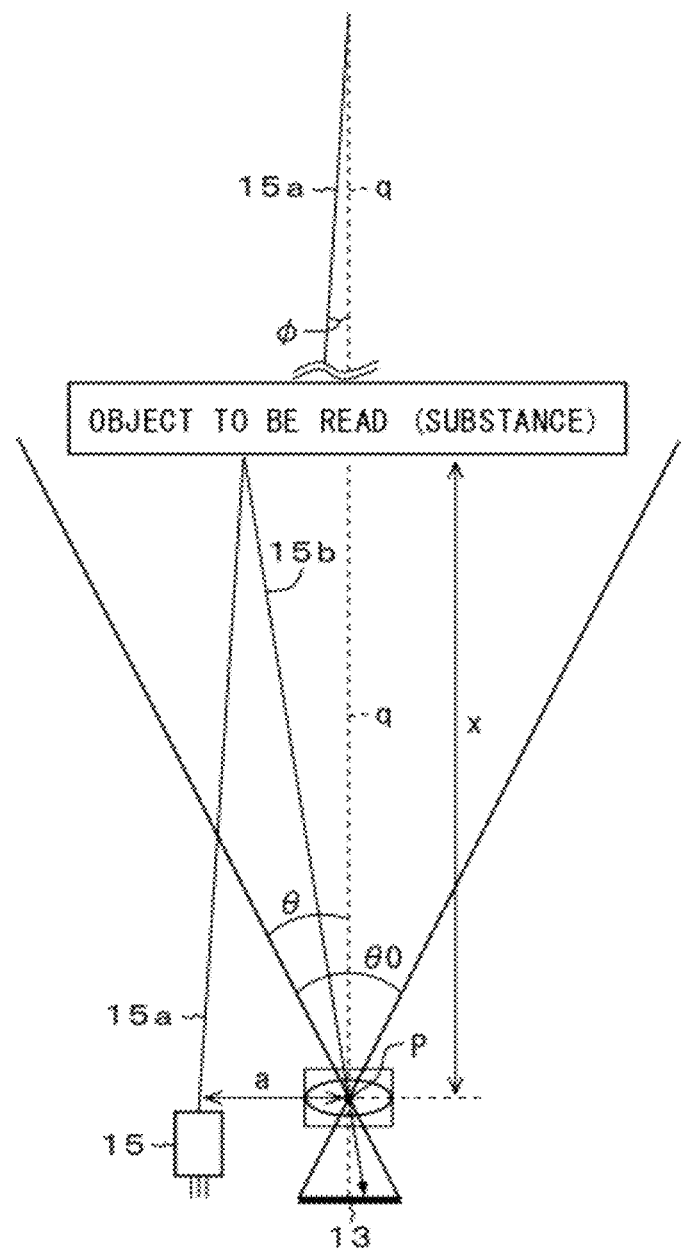

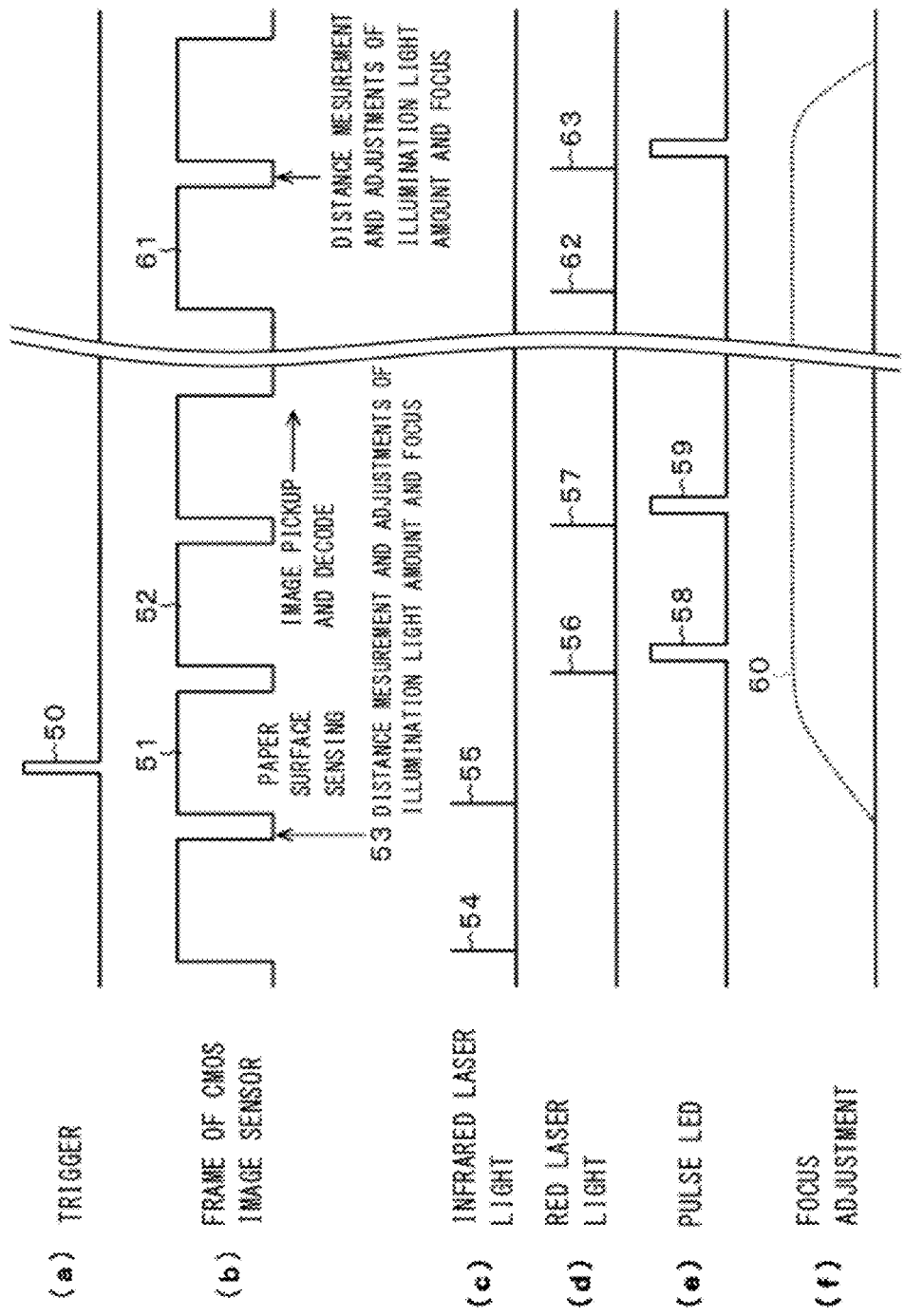

OPTICAL INFORMATION READER AND OPTICAL INFORMATION READING METHOD

The present application is a continuation of International Application No. PCT/JP2010/062852, filed Jul. 31, 2010, which designates the United States of America.

BACKGROUND OF THE INVENTION

1. Field of the Invention

The invention relates to an optical information reader including a code scanner, a two-dimensional code scanner, or a multi-code scanner picking up an image of a code symbol such as a barcode or a two-dimensional code composed of patterns having different light reflectances and reading out information indicated by the code symbol from the picked up image, and an optical information reading method of reading out the information indicated by the code symbol as described above.

2. Description of the Related Art

Conventionally, a code symbol such as a barcode or a two-dimensional code indicating information by a symbol different in light reflectance from surroundings is widely used as an automatic recognition means for article, document, material, specimen, and other various substances in a wide range of fields such as distribution, mail service, medical service, chemical experiment, and event site.

For example, when an article such as a merchandise or baggage having a code symbol attached thereto is put on a belt conveyor and moved to a predetermined place in an inspection process or distribution process, the code symbol attached to the article is read by a code scanner and the read information is transmitted to a host computer, which checks the contents of the article, records its progress, confirms distribution place and distribution time and so on.

Then, when reading the code symbol, it is necessary to accurately capture the code symbol moving on the belt conveyor and precisely decode the information indicated by the code symbol.

Further, for reading the code symbol, a code scanner which uses a solid-state image sensing element such as a CMOS sensor or a CCD sensor, is widely used as an optical reader.

As one conventional technique of the above-described optical reader, as described in PTL1 (see below), there is a technique wherein an image of a moving barcode is picked up by a plurality of image pickup elements arranged in two dimensions, the moving distance of the barcode in an exposure time in the image corresponding to output values of the image pickup elements is calculated by converting the moving distance into the number of image pickup elements, a static image of the barcode is restored from a portion including the barcode in the aforementioned image using the moving distance and a difference value between the output values of the image pickup elements adjacent to each other, and the restored barcode is decoded, whereby the barcode is read from a barcode image blurred due to movement.

Further, as another conventional technique, as described in PTL2 (see below), there is a technique wherein image pickup is tried several times until reading of information on a moving information code is successful, the conditions such as brightness of illumination and the like upon success are stored, and actual code reading is performed based on the conditions.

Furthermore, a commonly used digital camera using a solid-state image sensing element such as a CMOS sensor or a CCD sensor complies with a specification to enable, in a certain degree, picking up an image of a moving object as described in PTL3 (see below).

PTL1: Japanese patent laid-open publication No. 2002-230477
PTL2: Japanese patent laid-open publication No. 2004-110668
PTL3: Japanese patent laid-open publication No. 2006-197393

SUMMARY OF THE EMBODIMENTS

However, a problem in the technique described in PTL1 is that it is necessary to employ a high-performance solid-state image pickup device because the amount of calculation by the CPU for decoding the barcode from the picked up image becomes large, and it adversely affects the apparatus operation, leading to an increase in cost. Another problem is that it is impossible to decode the barcode precisely when the image including the barcode is an unfocused blurred image.

Next, in the technique described in PTL2, it is necessary to perform a test mode in advance and therefore it is impossible to start immediately the operation of reading the information code on the article. Further, the conditions applied at one site cannot always be used everywhere, and it is necessary to perform the test mode every time the place of use or the state of use changes, causing a burden on the operator. Accordingly, there is a problem that the information indicated by the object to be read cannot be quickly or precisely read.

Moreover, a problem in the technique described in PTL3 is that the body structure and software algorithm are too complicated to be applied to a code scanner, and processing unnecessary for pickup of an image of the code symbol is included, so that it cannot be expected to perform quick processing at the above-described working site and it is therefore impossible to quickly and precisely read the code symbol included in the object to be read with the above-described conventional techniques.

The invention has been developed in consideration of the aforementioned points and its object is to enable quick and precise reading of information indicated by a symbol different in light reflectance from surroundings, arranged on an object to be read, even if the distance to the object to be read and the moving speed of the object to be read are unknown.

To achieve the above object, embodiments of the invention provide an optical information reader which reads information indicated by a symbol different in light reflectance from surroundings, including: a laser output device that outputs a laser light; an illuminator that illuminates an object to be read; an image pickup device that picks up an image of the object to be read including an image sensor which has a shutter function capable of controlling start and stop of accumulation of charges according to an amount of light received in each pixel at substantially same time in all pixels and has a device that adjusts a focus of an optical system for forming an image of an incident light on the image sensor according to a value of a predetermined parameter; a first controller that performs control in a first mode of, when reading the information indicated by the symbol different in light reflectance from surroundings, instructing the image pickup device to start periodic image pickup in each predetermined frame period by the image sensor while turning on the laser light by the laser output device and, after the start of the accumulation of charges in a charge accumulation element in each pixel of the image sensor, stopping the accumulation of charges in charge accumulation elements in all pixels at a time point when charges equal to or more than a predetermined reference value are accumulated in at least one of the charge accumulation elements in the each frame period; a distance measurement device that analyzes an image picked up by the image pickup device in the each frame period in the first mode by start of a next frame period and, when a spot of a reflection light by the object to be read of the laser light outputted from the laser output device is detected in the image, measures a distance to the object to be read based on a position of the spot in the image; a second controller that sets, when the distance measurement device detects the spot of the reflection light, the value of the predetermined parameter for adjusting the focus of the optical system and an irradiation light amount of illumination by the illuminator at image pickup by the image pickup device, based on the distance to the object to be read measured by the distance measurement device, by start of a frame period next to the frame period when the spot is detected; a third controller that performs control in a second mode of tuning off the laser light by the laser output device after the frame period next to the frame period when the distance measurement device detects the spot of the reflection light, and tuning on the illuminator at the illumination light amount set by the second controller in synchronization with the start of charge accumulation in the charge accumulation element in each pixel of the image sensor at image pickup in each frame period; and a decoder that analyzes the image picked up by the image pickup device in the second mode and decoding the information indicated by the symbol different in light reflectance from surroundings arranged on the object to be read.

In the above optical information reader, it is conceivable that the optical information reader further include: a device that stores a focus table in which the distance to the object to be read is associated with the value of the predetermined parameter for setting the focus corresponding to the distance in the optical system included in the image pickup device, wherein the second controller adjusts the focus by driving the optical system included in the image pickup device based on the value of the parameter acquired by searching the focus table based on the distance measured by the distance measurement device.

Further, it is also conceivable that the value of the parameter corresponding to the distance in a predetermined range around a focal depth when the focus is set to a predetermined initial value is a fixed value corresponding to the predetermined initial value in the focus table.

Alternatively, it is also conceivable that the optical system included in the image pickup device includes a liquid lens whose refractive power is adjustable by application of a voltage, and the focus is adjusted by adjusting the voltage applied to the liquid lens.

Further, it is also conceivable that the optical information reader further include: a device that stores an illumination table in which the distance to the object to be read is associated with a value of a drive control parameter for instructing the illuminator to perform illumination at an irradiation light amount suitable for the distance, wherein the second controller sets the irradiation light amount of the illumination based on the value of the drive control parameter acquired by searching the illumination table based on the distance measured by the distance measurement device.

Furthermore, it is also conceivable that the optical information reader further include: a device that outputs a laser light of visible light and a device that outputs a laser light of invisible light, as the laser output device, and a device that instructs, when there is no operation by a user, the laser output device that outputs the laser light of the invisible light and switching, when there is a predetermined operation by the user, the laser light outputted from the laser output device to the laser light of the visible light.

Embodiments of the invention also provide an optical information reading method including: a first step of instructing an image pickup device including an image sensor which has a shutter function capable of controlling start and stop of accumulation of charges according to an amount of light received in each pixel at substantially same time in all pixels and has a device that adjusts a focus of an optical system for forming an image of an incident light on the image sensor according to a value of a predetermined parameter, to start periodic image pickup in each predetermined frame period by the image sensor while turning on a laser light by a laser output device and, after the start of the accumulation of charges in a charge accumulation element in each pixel of the image sensor, stopping the accumulation of charges in charge accumulation elements in all pixels at a time point when charges equal to or more than a predetermined reference value are accumulated in at least one of the charge accumulation elements in the each frame period; a second step of analyzing an image picked up by the image pickup device in the each frame period at the first step by start of a next frame period and, when a spot of a reflection light by an object to be read of the laser light outputted from the laser output device is detected in the image, measuring a distance to the object to be read based on a position of the spot in the image; a third step of setting, when the spot of the reflection light is detected at the second step, the value of the predetermined parameter for adjusting the focus of the optical system and an irradiation light amount of illumination by the illuminator at image pickup by the image pickup device, based on the distance to the object to be read measured at the second step, by start of a frame period next to the frame period when the spot is detected; a fourth step of tuning off the laser light by the laser output device after the frame period next to the frame period when the spot of the reflection light is detected at the second step, and tuning on the illuminator at the illumination light amount set at the third step in synchronization with the start of charge accumulation in the charge accumulation element in each pixel of the image sensor at image pickup in each frame period; and a fifth step of analyzing the image picked up by the image pickup device at the fourth step and decoding information indicated by a symbol different in light reflectance from surroundings arranged on the object to be read.

In the above optical information reading method, it is conceivable that at the third step, driving the optical system included in the image pickup device based on the value of the parameter acquired by searching a focus table in which the distance to the object to be read is associated with the value of the predetermined parameter for setting the focus corresponding to the distance in the optical system included in the image pickup device, based on the distance measured at the second step, is performed to adjust the focus.

Further, it is also conceivable that the value of the parameter corresponding to the distance in a predetermined range around a focal depth when the focus is set to a predetermined initial value is a fixed value corresponding to the predetermined initial value in the focus table.

Further, it is also conceivable that the optical system included in the image pickup device includes a liquid lens whose refractive power is adjustable by application of a voltage, and the focus is adjusted by adjusting the voltage applied to the liquid lens.

Furthermore, it is also conceivable that at the third step, the irradiation light amount of the illumination is set based on a value of a drive control parameter acquired by searching an illumination table in which the distance to the object to be read is associated with the value of the drive control parameter for instructing the illuminator to perform illumination at an irradiation light amount suitable for the distance, based on the distance measured at the second step.

Furthermore, it is also conceivable that the laser output device has a device that outputs a laser light of visible light and a device that outputs a laser light of invisible light, the method further including: a step of instructing, when there is no operation by a user, the laser output device to output the laser light of the invisible light and switching, when there is a predetermined operation by the user, the laser light outputted from the laser output device to the laser light of the visible light.

BRIEF DESCRIPTION OF THE DRAWINGS

FIG. 6 is an explanatory view of parameters required for calculation of the distance to an object to be read from the CMOS image sensor illustrated in FIG. 1;

FIG. 14 is a timing chart diagram of another operation example of respective portions at reading processing in a modification example of the code scanner illustrated in FIG. 1.

DETAILED DESCRIPTION OF THE PREFERRED EMBODIMENTS

Hereinafter, an embodiment for carrying out the invention will be concretely described based on the drawings.

First, a code scanner being an embodiment of an optical information reader of the invention will be described using FIG. 1 to FIG. 11.

Figure 1:
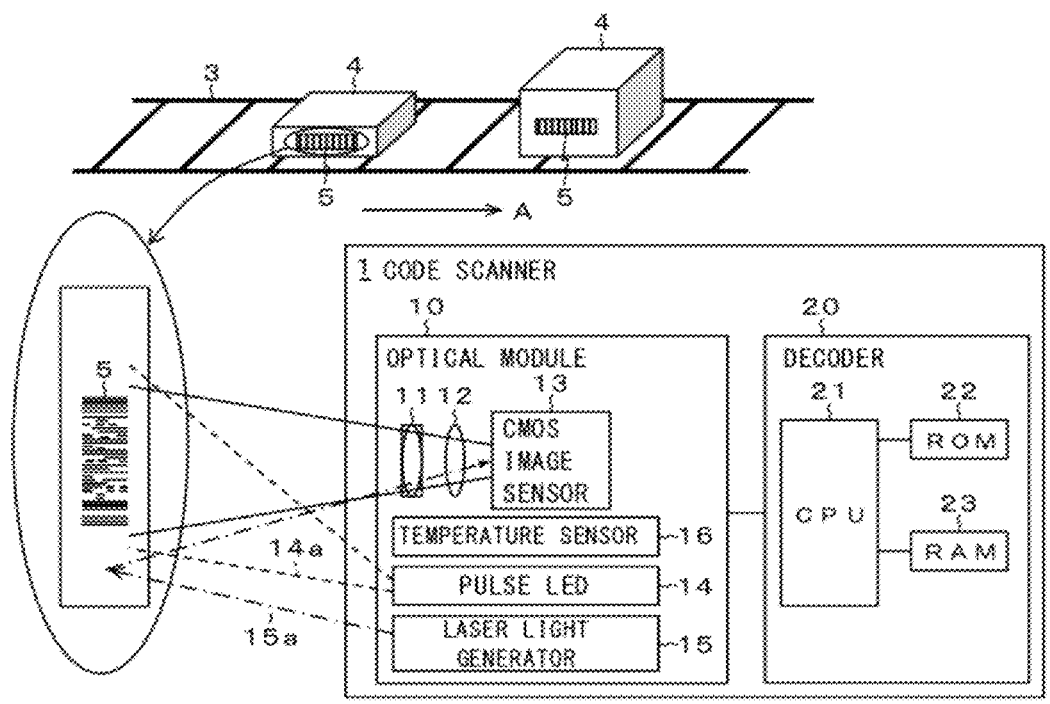
FIG. 1 is a block diagram illustrating an internal configuration of a code scanner being an embodiment of an optical information reader of the invention.

FIG. 1 is a block diagram illustrating an internal configuration of the code scanner.

As illustrated in FIG. 1, a code scanner 1 is an apparatus which is held by a hand of a user or placed at a fixed position in advance to read information on a code symbol or the like indicated by a symbol different in light reflectance from the surroundings. The code scanner 1 is configured here as an apparatus which picks up an image including a code symbol 5 arranged on baggage 4 being an object to be read which is placed on a belt conveyer 3 and moved in a direction indicated by an arrow A in the drawing, and reads out information indicated by the code symbol 5 based on the image, and the code scanner 1 can, of course, read code symbols attached to baggage placed on a baggage rack or the like and stands still.

The aforementioned code symbol 5 is a symbol different in light reflectance from the surroundings, and various symbols including a barcode and a two-dimensional code can be used therefor.

The code scanner 1 includes an optical module 10 and a decoder 20.

The optical module 10 among them is a module which irradiates an object to be read with a laser light and detects reflected light and picks up an image of the object to be read including the code symbol 5 in order to sense the object to be read and measure the distance to the object to be read, and has a focus lens 11, a master lens 12, a CMOS (Complementary Metal Oxide Semiconductor) image sensor 13, a pulse LED (Light Emitting Diode) 14, a laser light generator 15, and a temperature sensor 16.

The focus lens 11 and the master lens 12 constitute a lens group for forming an image of the reflected light from the object to be read including the code symbol 5 on the CMOS image sensor 13. The reflected light contains reflected light of the laser light irradiated from the laser light generator 15 and the illumination light irradiated from the pulse LED 14.

Here, a lens made of glass or plastic is used as the master lens 12, and a liquid lens whose focal length can be adjusted by a voltage applied thereto is used as the focus lens 11.

Figure 2:
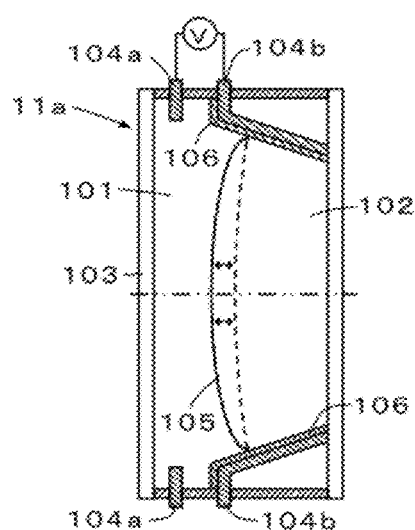
FIG. 2 is a sectional view illustrating a configuration example of a liquid lens included in the code scanner illustrated in FIG. 1.

An example of the structure of the liquid lens is illustrated by a sectional view in FIG. 2.

A liquid lens 11a is formed by sealing an aqueous solution 101 with a high conductivity and an oil 102 being an insulator in a container 103 having transparent window portions transmitting light at two opposing surfaces. Further, the liquid lens 11a includes an electrode 104a in contact with the aqueous solution 101 and an electrode 104b in contact with both the aqueous solution 101 and the oil 102 via an insulation part 106.

In the liquid lens 11a, the shape of a boundary surface 105 between the aqueous solution 101 and the oil 102 can be changed as illustrated by a broken line and a solid line utilizing the electro-wetting phenomenon by applying a voltage between the electrode 104a and the electrode 104b. Thus, this makes it possible to control its refractive power to the light passing through the window parts according to the strength of the applied voltage, to adjust its focal length.

In the code scanner 1, the liquid lens 11a is used as the focus lens 11 and the voltage applied to the electrodes of the focus lens 11 is controlled, whereby the focal length of the whole lens group can be adjusted.

Note that the liquid lens is described in detail, for example, in "Bruno Berge, 'Zero mechanical parts, ability of liquid lens getting closer to mass production' Nikkei Electronics, Japan, Nikkei BP Inc., Oct. 24, 2005, p. 129-135" and therefore the description more detailed than the above is omitted.

Returning to the description of FIG. 1, the CMOS image sensor 13 is an image pickup device for picking up an image of the object to be read by detecting incident light thereon through the above-described lens group using sensors arranged in an array form and outputting detection signals by the sensors as digital image data to the decoder 20.

Figure 3:
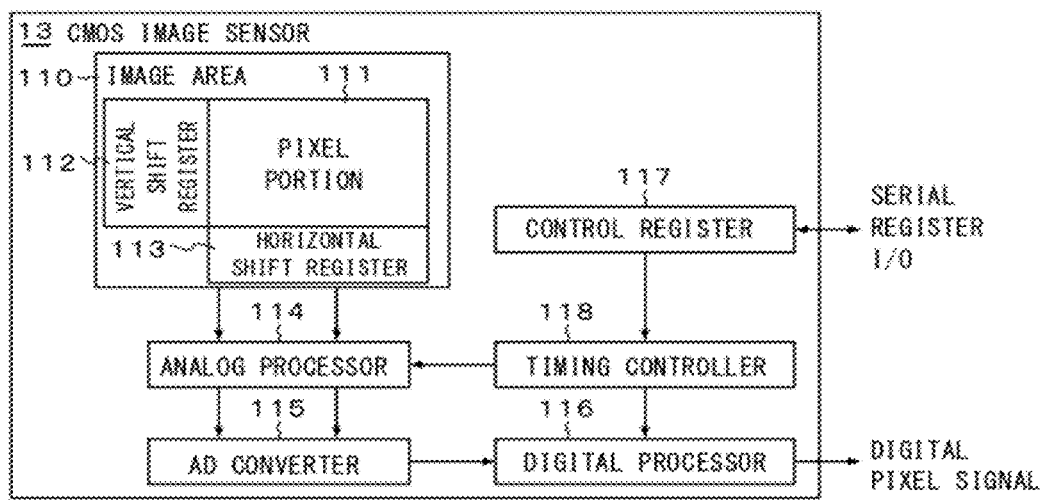
FIG. 3 is a block diagram illustrating an internal configuration example of a CMOS image sensor illustrated in FIG. 1.

An internal configuration example of the CMOS image sensor 13 is illustrated in FIG. 3.

As illustrated in FIG. 3, the CMOS image sensor 13 has an image area 110, an analog processor 114, an analog-digital (AD) converter 115, a digital processor 116, a control register 117, and a timing controller 118.

In the image area 110 among them, a plurality of pixels each having a photodiode, a flouting diffusion (FD) region, a transfer transistor for transferring charges from the photodiode to the FD region, and a reset transistor for resetting the FD region to a predetermined potential, are formed in a matrix form in a pixel portion 111, and a vertical shift register 112 controlling a vertical signal and a horizontal shift register 113 controlling a horizontal signal, for designating a readout pixel, are arranged.

Each of the vertical shift register 112 and the horizontal shift register 113 is an analog circuit which generates a voltage required for pixel driving and sequentially outputs image signals of the pixels according to the charge amount accumulated in the FD regions, and the outputted image signals from the pixels are outputted to the decoder 20 through the analog processor 114, the AD converter 115, and the digital processor 116 in sequence.

The analog processor 114 performs predetermined analog signal processing such as voltage amplification, gain adjustment and the like on the analog pixel signal outputted from the pixel designated by the vertical shift register 112 and the horizontal shift register 113.

The AD converter 115 converts the analog image signal outputted from the analog processor 114 into digital image data.

The digital processor 116 performs digital processing such as noise cancellation, data compression and the like on the digital image data outputted from the AD converter 115 and outputs the processed digital image data to the decoder 20.

Further, the control register 117 stores a signal inputted/outputted from/to a serial register I/O, synchronizes clock timing of the analog processor 114 with that of the digital processor 116 by the timing controller 118, converts the analog image signals from the pixels in the pixel part 111 into digital image data in a predetermined order and outputs the converted digital image data to the decoder 20.

Further, the CMOS image sensor 13 employs a global shutter which controls start and stop of accumulation of charges according to the amount of light received in each pixel at substantially the same time in all of the pixels, and includes a plurality of comparators each individually comparing the value corresponding to the accumulated charges in each pixel to a reference value, a terminal for outputting a logical sum signal of the output signals therefrom and so on though not illustrated.

Then, when at least one of the outputs from the plurality of comparators in the pixel part 111 indicates that the accumulated charges exceed the reference value, the global shutter is controlled to perform stop of the accumulation of charges in each pixel.

The digital image data picked up and outputted by the CMOS image sensor 13 is used for sensing the object to be read, measuring the distance to the object to be read, and reading information indicated by the code symbol 5 in the decoder 20.

Further, the above-described global shutter can control start of accumulation and stop of accumulation of charges according to the amount of received light in each pixel at substantially the same time in all of the pixels and therefore ensures that the pixel signal according to the amount of signal charges accumulated in the FD region is obtained, unlike a rolling shutter which releases shutters in sequence for every scan line. Adjustment of the transfer timing to the FD region after exposure enables release of the shutter in synchronization with the light emission from the pulse LED 14 and the emission of the laser light from the laser light generator 15 and thus enables a very fast shutter speed, thereby eliminating blur of the image by a moving body. Further, it is possible to receive only the reflected light of the laser light without it being affected by environmental light.

Returning to the description of FIG. 1, the pulse LED 14 is an illuminator for illuminating the object to be read by irradiating the object to be read with an illumination light 14a according to the control from the decoder 20. This illumination is performed by irradiation with a pulse light in synchronization with an image pickup frame of the CMOS image sensor 13, and the amount of charge accumulated in each of the photodiodes of the CMOS image sensor 13 by the reflection light from the object to be read in one frame of image pickup period can be adjusted by adjusting the irradiation time with the pulse light. In short, when the illumination time is made longer, the image obtained by the CMOS image sensor 13 by image pickup becomes a brighter image, whereas when the illumination time is made shorter, the image becomes a darker image.

The laser light generator 15 is a laser output device for outputting a laser light 15a used for sensing the object to be read and measuring distance to the object to be read. The laser light generator 15 is arranged at a position and at an angle so that when an object to be read is located at a position where a code symbol 5 thereon is considered to be readable by the code scanner 1, the reflected light from the object to be read (not limited to the position of the code symbol 5) can be made incident on the CMOS image sensor 13. Further, the laser light outputted from the laser light generator 15 may be visible light, invisible light, or light with an arbitrary wavelength, and the laser light generator 15 is preferably the one which outputs, for example, red laser light at 650 nm (nanometer), or infrared laser light at 780 nm.

When using the visible light as the laser light, the laser light can be used not only for measuring the distance but also for aligning the code symbol 5 with the reading range of the code scanner 1 because the spot formed by the laser light can be viewed. On the other hand, when using the invisible light, the laser light, even turned on in pulses, never makes people around it feel bad because the spot formed by the laser light is not viewed. Therefore, the code scanner 1 can be configured such that the laser light is turned on in pulses at all times, so as to speedily start reading without an action and operation for turning on the laser light.

Note that it is also conceivable to use a two-wavelength laser generator capable of outputting both laser lights of the visible light and the invisible light so as to enable to automatic or manual switching between the two kinds of laser light according to the situation.

The temperature sensor 16 is a temperature sensor for sensing temperature around the code scanner 1, in particular, temperature around the focus lens 11. The relationship between the applied voltage and the focal length of the liquid lens changes depending on temperature, and therefore the value of the voltage applied in order to bring the focal length to a predetermined value is determined also in consideration of the temperature sensed by the temperature sensor 16. However, the description about the temperature will be omitted in the following description except when particularly necessary, for simplification of the description.

Next, the decoder 20 includes a CPU 21, a ROM 22 storing a program executed by the CPU 21 and a table, and a RAM 23 used as a work area when the CPU 21 executes various kinds of processing.

As the above-described CPU 21, ROM 22, and RAM 23, for example, an ASIC (Application Specific Integrated Circuit), a flash rom (FROM), and an SDRAM (Synchronous Dynamic Random Access Memory) can be used.

The CPU 21 executes the program stored in the ROM 22 using the RAM 23 as the work area to thereby control operation of the whole code scanner 1, and performs processing required for sensing the object to be read, measuring distance to the object to be read, adjusting the focal length and the illumination light amount based on the distance measurement, decoding the code symbol 5, outputting to the outside or accumulating the decoding result and so on, based on data of the digital image picked up by the CMOS image sensor 13.

Figure 4:
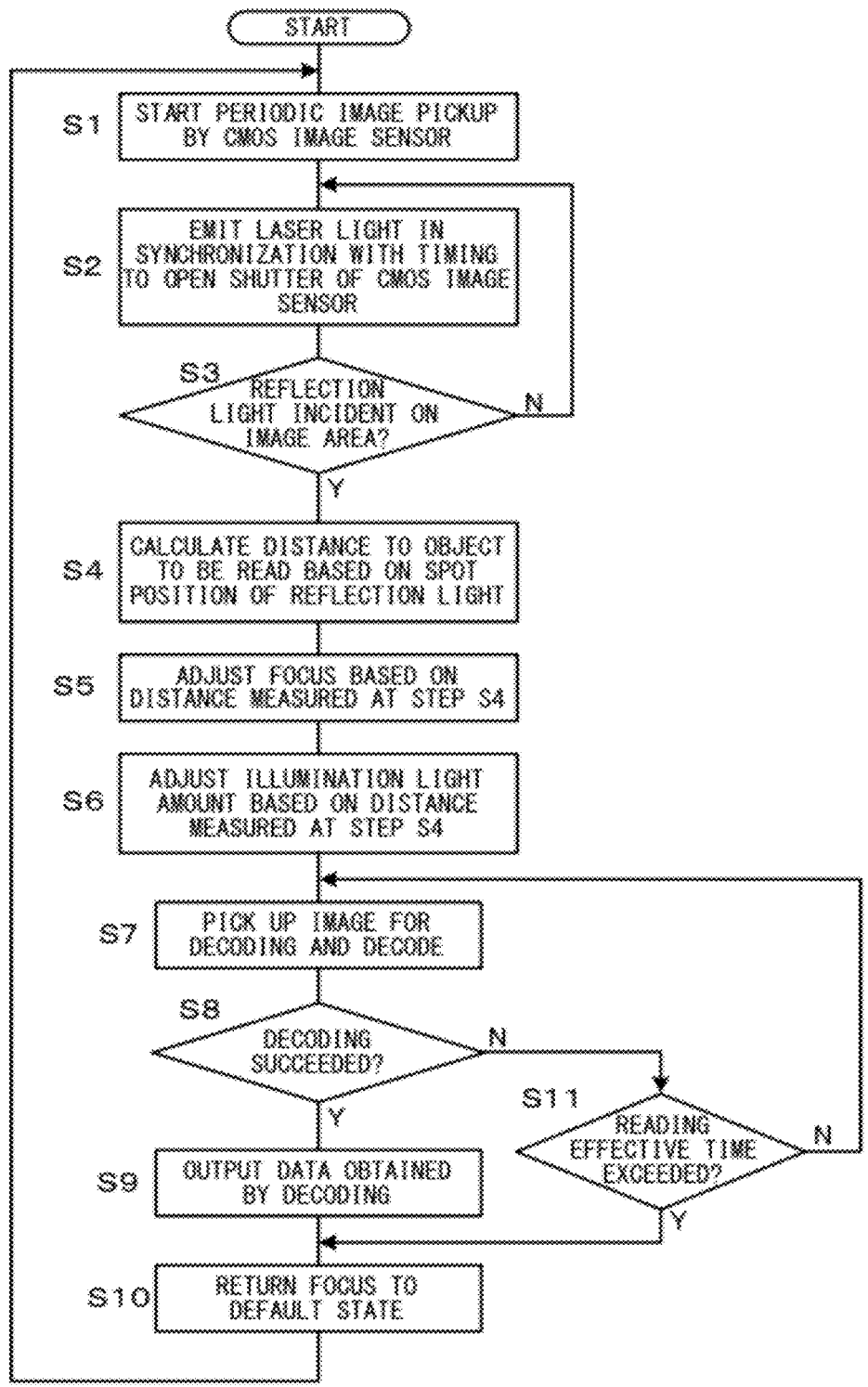
FIG. 4 is a flowchart illustrating reading processing executed by a CPU of the code scanner illustrated in FIG. 1.

Next, processing of reading the code symbol 5 in the code scanner 1 will be described using FIG. 4. FIG. 4 is a flowchart illustrating the reading processing executed by the CPU 21 of the code scanner 1.

The CPU 21 starts the processing presented in the flowchart of FIG. 4 automatically upon activation of the code scanned or under an instruction to execute reading of the code symbol.

Then, the CPU 21 firstly instructs the CMOS image sensor 13 to start periodic image pickup at Step S1. The shutter speed in this event is set at a shutter speed so that little or no surrounding environmental light is detected and the reflection light of the laser light 15a outputted from the laser light generator 15, which is large in light amount as compared to the environmental light, can be selectively detected. In the case of using the above-described global shutter, when the reflection light of the laser light 15a is incident on the CMOS image sensor 13, charges are accumulated in pixels at a portion of the spot of the reflection light more rapidly than at the other portion, and the shutter is released quickly before so many charges are accumulated in the pixels at the other portion, so that the spot of the reflection light can be effectively detected.

At subsequent Step S2, the CPU 21 supplies an appropriate control signal to the laser light generator 15 to instruct the laser light generator 15 to emit the laser light 15a in synchronization with the timing to open the shutter of the CMOS image sensor 13 (start the accumulation of charges by the photodiodes).

Then, at Step S3, the CPU 21 judges whether or not the reflection light of the laser light has been incident on the image area 110 of the CMOS image sensor 13, that is, whether or not the spot of the reflection light appears in the image data, by analyzing the image data outputted from the CMOS image sensor 13.

When the reflection light has not been incident here, it can be considered that the object to be read is not located at the position where the code symbol can be read by the code scanner 1, and therefore the CPU 21 does not proceed to the following processing of adjusting the reading condition and picking up an image for reading, but returns to Step S2 and repeats the processing. If the object to be read is not detected even though the processing is repeated in a predetermined period, the frame speed of the CMOS image sensor 13 may be temporarily decreased (the frame period may be increased).

When the reflection light has been incident at Step S3, it is found that some substance (presumable as the object to be read) exists at the position where the code symbol is possibly readable by the code scanner 1. In short, the existence of the object to be read can be sensed.

The processing at Steps S2 and S3 is called the operation in a paper sensing mode, and the paper sensing mode is operated at all times after the power of the code scanner is turned ON or a predetermined command is detected after the power ON, and is ended when the power is turned OFF or a predetermined command is detected.

Figure 5:
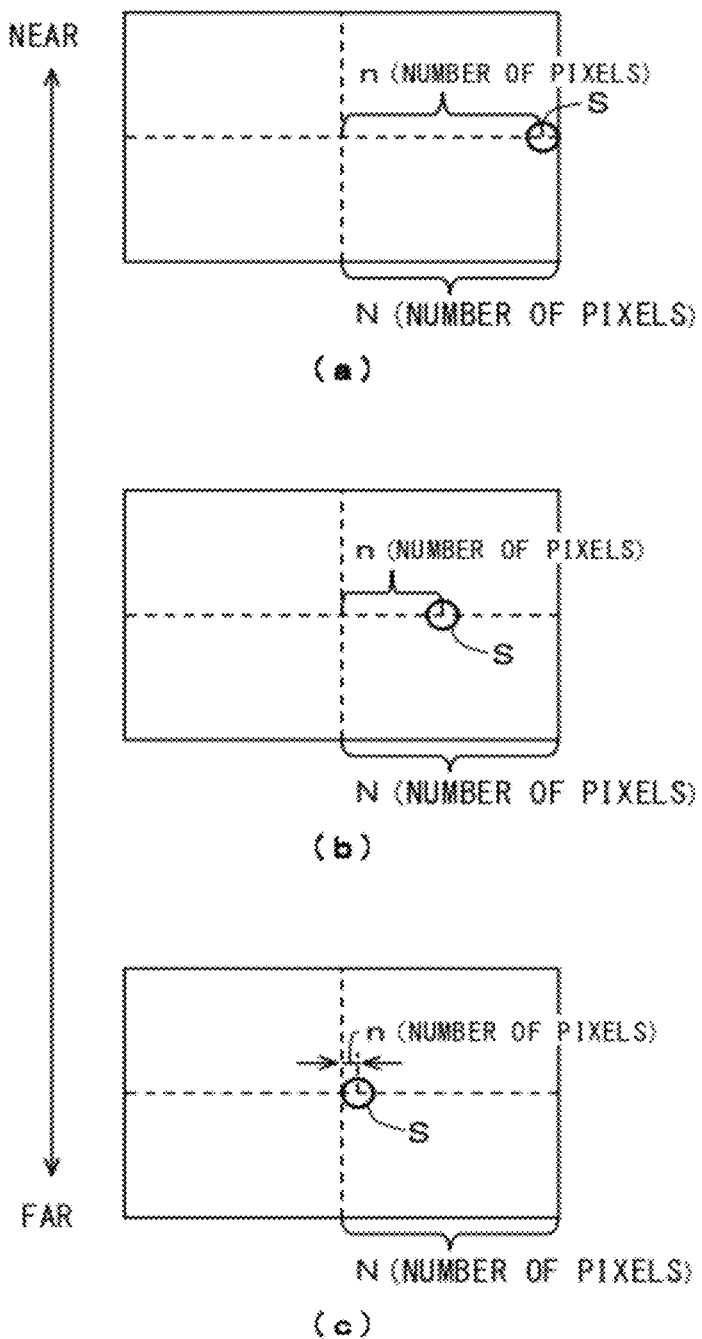
FIG. 5 is an explanatory view illustrating examples of reflection light seen in an image area illustrated in FIG. 3.

In this case, as illustrated at (a) of FIG. 5, when the object to be read is located near, a spot S appears at an end in the horizontal axis direction in the picked up image, whereas when the object to be read is located far, the spot S appears near the center as illustrated at (c). Hence, the CPU 21 proceeds to Step S4 and calculates the distance from the CMOS image sensor 13 to the sensed object to be read based on the position of the spot of the reflection light in the image.

Next, the method of calculating the distance to the object to be read (substance) will be described.

FIG. 6 is an explanatory view of parameters required for the calculation of the distance to the object to be read.

A distance x to the object to be read can be calculated based on the following parameters in the drawing and the following Equation 1.

x: distance from a principal point P of an image pickup optical system lens to the object to be read a: distance from the principal point P of the image pickup optical system lens to (the center of) the laser light 15a when measured in a direction in parallel to the image area of the CMOS image sensor 13

$\theta$: angle of ½ of a viewing angle $\theta 0$ spreading in the direction of the laser light 15a from the principal point P of the image pickup optical system lens N: ½ of the number of pixels in the CMOS image sensor 13 when counted in the direction toward the laser light 15a from the principal point P of the image pickup optical system lens (see FIG. 5) n: number of pixels from the center position in the CMOS image sensor 13 (the position corresponding to the principal point P of the image pickup optical system lens) to the center position of the spot of the reflection light 15b (see FIG. 5)

$\phi$: angle formed between the laser light 15a and an optical axis q of the image pickup optical system lens $$x = \frac{a}{\tan\theta \frac{n}{N} + \tan\phi} \qquad [\text{Equation 1}]$$

Note that the laser light 15a indicated on the upper side of the object to be read in FIG. 6 is for explaining the angle $\phi$.

At subsequent Step S5, the CPU 21 acquires a value of a focus control parameter by searching a focus table which has been stored in advance in the ROM 22, based on the distance calculated at Step S4, and drives the focus lens 11 based on the value of the focus control parameter to adjust the focus so that the focus is in the vicinity of the distance calculated at Step S4. The details of this adjustment will be described later.

At Step S6, the CPU 21 acquires a value of a parameter indicating the lighting time of the pulse LED 14 by searching an illumination table which has been stored in advance in the ROM 22 based on the distance calculated at Step S4, and sets the lighting time of the pulse LED 14 at image pickup based on the acquired value to adjust the irradiation light amount so that an appropriate amount of reflected light can be obtained from the object to be read located near the distance calculated at Step S4. The details of this adjustment will be also described later.

The adjustments at Steps S5 and S6 may be performed in a reverse order or in parallel.

Further, even when the adjustments at Steps S5 and S6 are started, for example, at the same time, the processing at Step S6 can be ended in substantially real time, whereas the processing at Step S5 could take more time than the processing at Step S6, and therefore both adjustments will be ended at different time points.

At subsequent Step S7, the CPU 21 turns on the pulse LED 14 for illumination only during the lighting time set at Step S6 in synchronization with the timing to open the shutter of the CMOS image sensor 13, to thereby pick up an image of the object to be read sensed at Step S3 and try to decode the code symbol assumed to be attached to the object to be read from the resulting obtained image data.

Then, the CPU 21 judges whether or not the decoding has succeeded at Step S8 and, if it succeeded, outputs the data obtained by the decoding to a predetermined external device, an internal data processor and the like at Step S9, returns the focus to a default state at Step S10, and then completes the reading and returns to Step S1.

On the other hand, if the decoding has failed, the CPU 21 judges at Step S11 whether or not a reading effective time (may be defined by the number of frames) set in advance has been exceeded, and if not exceeded, returns to Step S7 and tries again to pick up an image and decode it.

The conceivable causes of failure of the decoding at Step S8 include various cases such that the code symbol is not attached to the detected object to be read in the first place, as well as that the code symbol does not fall within the image pickup range of the CMOS image sensor 13, that the adjustments at Steps S5 and S6 have not been appropriately performed. Some of these situations might be improved by a lapse of a time required for response to the adjustments or by movement of the object to be read, and therefore a retry is made.

Then, when the reading effective time is exceeded at Step S11, the CPU 21 judges that there is no chance to perform normal decoding even if the decoding is continued any longer, stops reading, returns the focus to the default state at Step S10, and returns to Step S1.

As described above, in cases of both success and termination of the reading, the CPU 21 returns to Step S1 and immediately starts the process of detecting the next object to be read.

Next, the operation timings of the respective portions when the code scanner 1 reads the code symbol 5 by the processing illustrated in FIG. 4 will be described.

Figure 7:
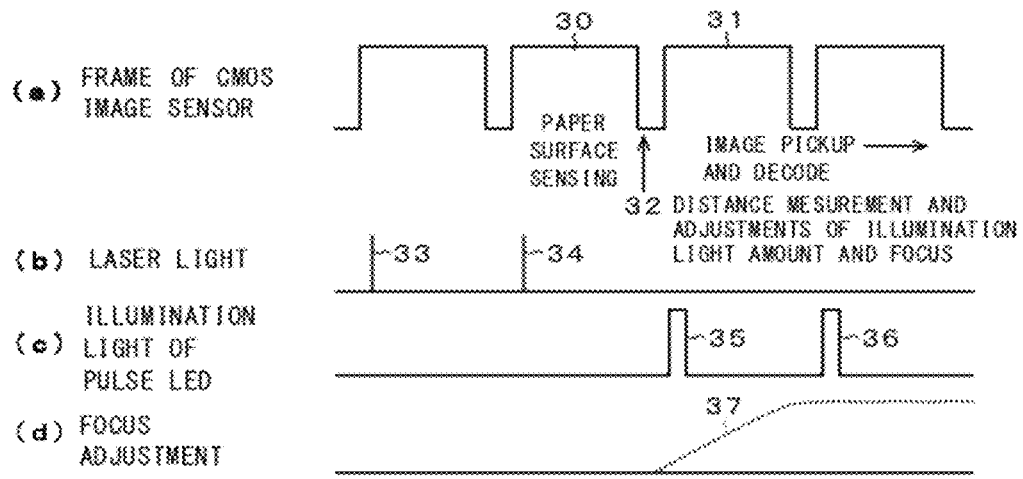
FIG. 7 is a timing chart illustrating an example of operation timings of respective portions when the code scanner illustrated in FIG. 1 reads the code symbol.

FIG. 7 is a timing chart illustrating an example of the operation timings.

Upon activation of the CMOS image sensor 13, the code scanner 1 opens and closes the shutter at a shutter speed enabling selective detection of the reflected light of the laser light 15a outputted from the laser light generator 15 as described above, and repeats picking up an image in a unit of frame by free-running as illustrated at (a). Note that the frame referred to here means a period required for picking up an image one time, including accumulation of charges according to light reception and readout of an image signal, and the period when the shutter is open (accumulation of charges by the photodiode is performed) is a very small part of the frame.

Further, until the object to be read is sensed, the laser light generator 15 emits the pulse light of the laser light 15a in each frame at the timing indicated by a reference signs 33 and 34 as illustrated at (b) in synchronization with the timing to open the shutter of the CMOS image sensor 13.

Then, for example, when the reflection light from the baggage 4 is seen in the image area 110 of the CMOS image sensor 13 by the above-described paper surface sensing processing and the object to be read is sensed at the time of image pickup in a frame 30, the above-described distance measurement and adjustments of the illumination light amount and the focus are executed at the timing shown by an arrow 32 in (a) until the next frame.

Then, after the above-described adjustments, the pulse LED 14 emits the pulse light for illumination in each frame at the timing indicated with reference signs 35 and 36 as illustrated at (c) in synchronization with the timing to open the shutter for image pickup in a next frame 31. The pulse width follows the setting that the CPU 21 performs according to the distance to the object to be read. Further, the laser light generator 15 is turned off in the frame when the pulse LED 14 is turned on.

Further, when there is a need to change the focus according to the result of distance measurement, the adjustment of the focus is also started at the timing of the arrow 32, but this adjustment requires a certain length of response time as indicated by a broken line at (d).

Then, for data of the image picked up in each frame after the frame 31, decoding of the code symbol in the image is tried, and image pickup is continued under the same condition until the decoding succeeds or the reading effective time is exceeded even when the decoding failed.

Next, the focus adjustment will be described.

As described above, when the liquid lens 11a is used as the focus lens 11, the refractive power of the liquid lens 11a can be adjusted by the voltage to be applied to the electrodes of the liquid lens 11a. Hence, in the focus adjustment at Step S5 in FIG. 4, the refractive power of the liquid lens 11a is adjusted so that the optical system composed of the focus lens 11 and the master lens 12 is focused on the position of the object to be read, based on the distance to the object to be read obtained by the distance measurement at Step S4.

In this event, how much voltage should be applied when the optical system is focused on a position can be measured in advance from the relation between the applied voltage and the refractive power of the liquid lens 11a.

Figure 8:
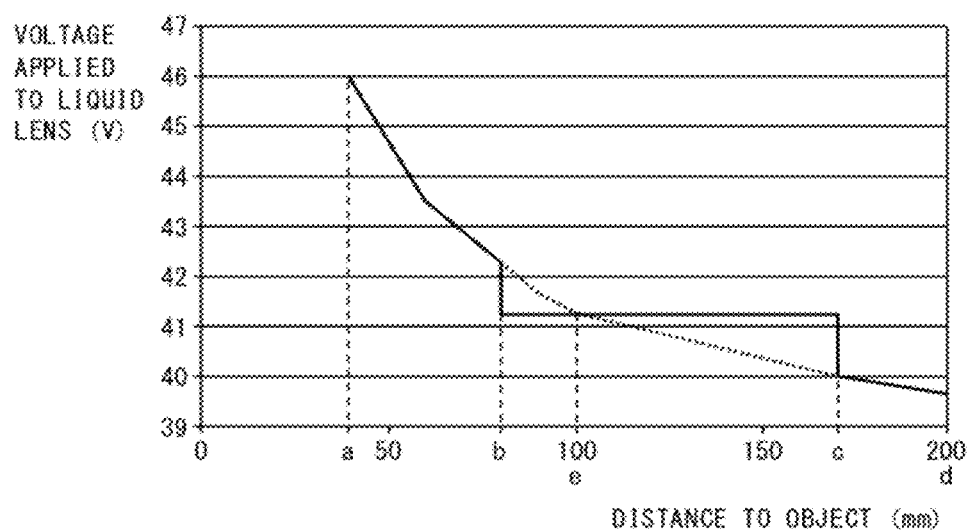
FIG. 8 is an explanatory diagram illustrating an example of data contents in a focus table used in the code scanner illustrated in FIG. 1.

Hence, in the code scanner 1, the relation between the distance to the object to be read and the value of voltage which should be applied to the liquid lens 11a for focusing the optical system to that distance (parameter used for driving the liquid lens 11a) as illustrated in FIG. 8 is determined in advance by experiments (or by adjustment at production) and stored in the ROM 22 as a focus table as to the distance range from a to d on which the optical system is focused. Though the relation is shown as a graph of a continuous value in FIG. 8, the value of voltage to be applied will be determined actually for each of a certain degree of distance range. Then, for focus adjustment, the focus table is searched based on the distance to the object to be read, as obtained by the distance measurement at Step S4 in FIG. 4, and a voltage corresponding to the distance is applied between the electrodes 104a and 104b of the liquid lens 11a.

Figure 9:
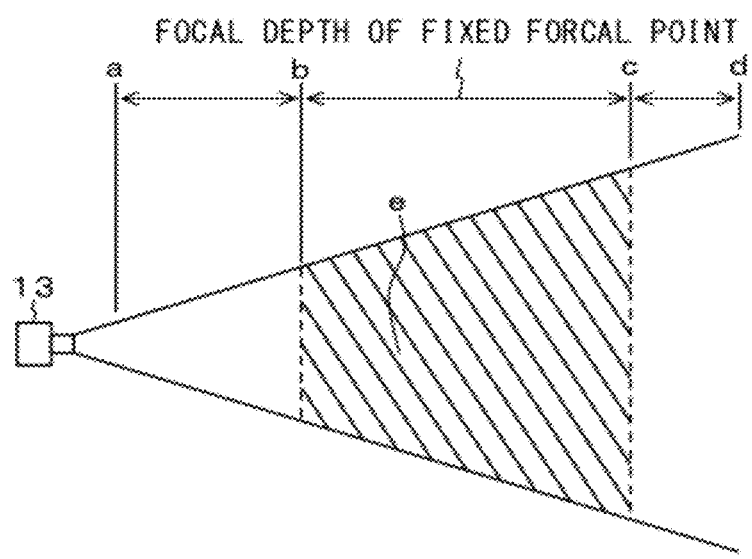
FIG. 9 is an explanatory diagram of the focal depth in the code scanner illustrated in FIG. 1.

Note that the optical system generally has a certain degree of focal depth as illustrated in FIG. 9, and can clearly form an image of not only a substance located at a position very close to a focal position e but also a substance located at a position at some distance therefrom like in a range b-c, at which the code symbol can be decoded. Accordingly, the image becomes increasingly blurred as it is displaced farther from the focal position, but if the displacement is in a certain range, the decoding can be appropriately performed at Step S7 in FIG. 4 even if an image is picked up with the focal position fixed at the initial value.

On the other hand, as illustrated in FIG. 7, some response time is required for the adjustment of the focus, so that when trying to adjust the focus, if the optical system does not become stable in about one to several frames, appropriate image pickup may not be performed.

Hence, the code scanner 1 is configured such that the applied voltage is not changed from the initial value in the range b-c where a decodable image is obtained even in a state that the optical system is focused on the fixed initial value position e as illustrated by a solid line in FIG. 8. The broken line indicates the voltage value for focusing the optical system on each position in the range, but since the focus adjustment is not always necessary for the purpose of decoding the code symbol in this range, priority is given to eliminating the response time for the adjustment and thereby obtaining the decoding result as fast as possible.

However, this configuration is not essential, and it is also conceivable to employ a focus table of the values indicated by the broken line and to perform the focus adjustment for all distances between b and c. Further, it is also conceivable to employ a focus table having the values indicated by the broken line, while not performing the processing of focus adjustment when the distance obtained by the distance measurement falls within the range b-c. In these cases, it is also possible to enable the user to adjust the range where adjustment is not performed.

Figure 10:
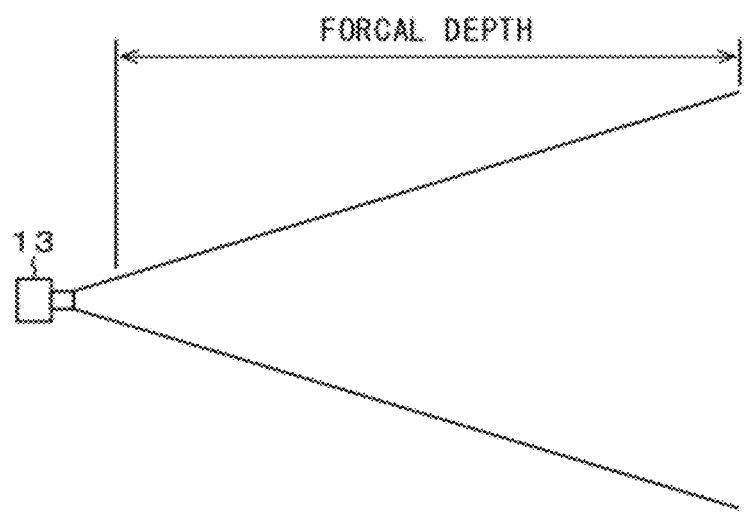
FIG. 10 is another explanatory diagram of the focal depth in the code scanner illustrated in FIG. 1.

In any case, according to the code scanner 1, when the object to be read is detected at a distance where the optical system cannot be focused by the fixed focal point and an image whose code symbol is decodable cannot be obtained, the focus is automatically adjusted depending on the distance and an image for decoding is picked up, thereby ensuring that the code symbol can be read even if the object to be read is located at any distance as long as it is within the adjustable range, and a very large focal depth can be practically obtained as illustrated in FIG. 10.

Further, the processing required for the above to apply a control parameter acquired by searching the table data prepared in advance, and therefore is very simple and can acquire an image required for decoding in a short time such as about one or several frames without the necessity of repeating exposure control and focus driving based on the image or performing complicated calculations. Thus, even when the object to be read is moving at a high speed, an image for decoding can be picked up and accurate and reliable reading can be performed after the object to be read is detected and before the object to be read moves out of the image pickup range.

For example, when the object to be read including the code symbol 5 is moving, the number of frames seen in the pixel part 111 of the CMOS image sensor 13 is decreased. It is therefore important for stable reading to pick up an image including the code symbol 5 as fast as possible in an appropriate state without blurring by such simple processing.

Next, the adjustment of illumination light amount will be described.

Figure 11:
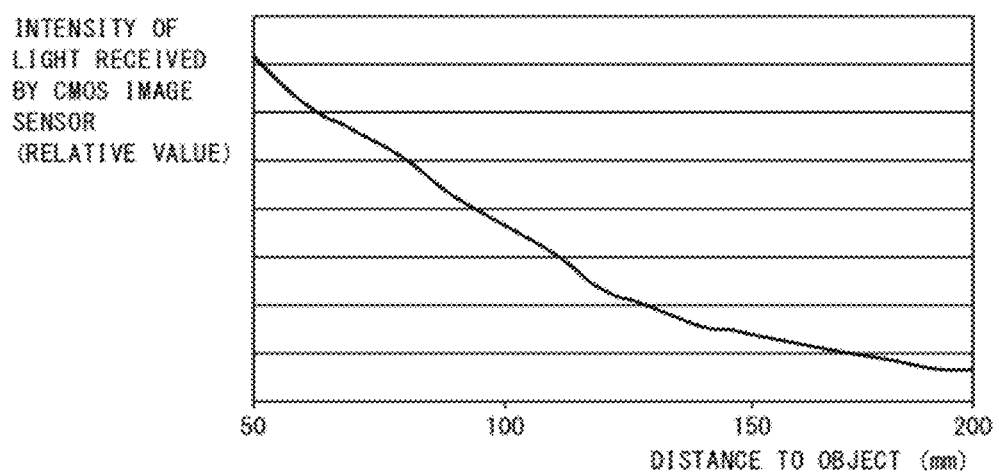
FIG. 11 is an explanatory diagram illustrating relation between distance to an object to be read in the code scanner illustrated in FIG. 1 and intensity of light received by the CMOS image sensor.

As described above, in the code scanner 1, when picking up an image used for decoding the code symbol 5 by picking up an image of the object to be read, illumination by the pulse LED 14 is performed. However, the illumination light diffuses more with increased distance to the object to be illuminated, so that when the illumination is performed at the same intensity, the reflected light received by the CMOS image sensor 13 is stronger as the distance to the object to be read is shorter, and the reflection light is weaker as the distance is longer as illustrated in FIG. 11.

Hence, the code scanner 1 is configured such that the illumination light amount is increased more as the distance to the object to be read is farther, so that the CMOS image sensor 13 can receive a generally fixed amount of the reflected light regardless of the distance to the object to be read.

Figure 12:
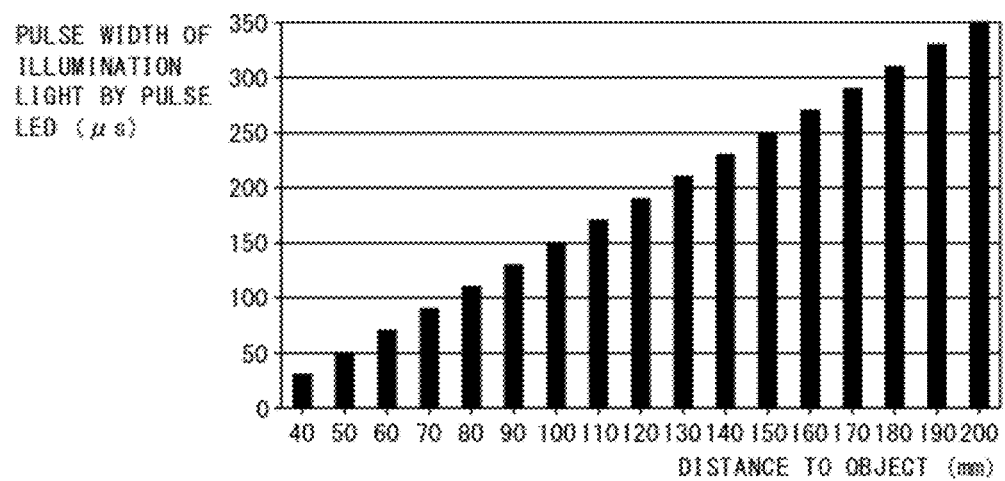
FIG. 12 is an explanatory diagram illustrating an example of data contents in an illumination table used in the code scanner illustrated in FIG. 1.

An illumination table indicating the correspondence between distance to the object to be read and pulse width of the illumination light with the contents as illustrated in FIG. 12 is determined by experiments (or by adjustment at production) and stored in the ROM 22 in advance so that the illumination table is searched based on the distance to the object to be read obtained by the distance measurement at Step S4 when adjusting the illumination light amount at Step S6 in FIG. 4, and the pulse LED 14 is driven at image pickup at Step S7 with a pulse width according to that distance. Since there is no problem in response time in the adjustment, there is no particular need to consider that the adjustment is not performed when the distance is close to the initial value.

Note that it is preferable to set the pulse width set in the illumination table at a very small value, for example, a pulse width corresponding to a light emission time equal to or less than 400 µs (microseconds) because of use of the stroboscopic effect in order to mitigate the effect of moving shake at pickup of an image of the object to be read.

By performing the adjustment, an image with a fixed brightness can be obtained regardless of the distance to the object to be read when picking up an image for decoding, thereby increasing the accuracy and the probability of successful decoding. In particular, when most of the light received by the CMOS image sensor is not environmental light but the illumination light, the adjustment of the illumination light amount is important. In addition, control can be realized without performing complicated calculations.

Note that though the irradiation time of the illumination light is controlled in consideration of ease of control here, the irradiation intensity may be controlled. By any means, the same effect can be obtained as long as the amount of light incident on the CMOS image sensor 13 can be adjusted during the time when the shutter is open.

That is the explanation of the embodiment, but the configuration of the apparatus, the concrete processing and so on are not limited to those described in the above-described embodiment.

Figure 13:
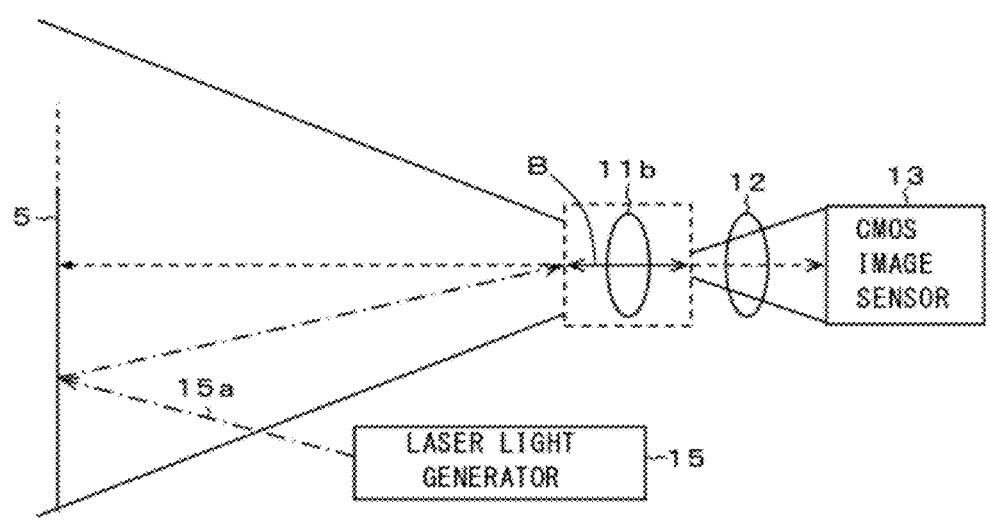
FIG. 13 is a diagram illustrating another configuration example of an optical system provided in the code scanner illustrated in FIG. 1.

For example, as illustrated in FIG. 13, a normal solid lens 11b made of glass or plastic may be employed as the focus lens 11, and a driver for driving the solid lens 11b forward and backward in an optical path (in the direction of arrow B in FIG. 13) may be provided to make the focal length adjustable in the whole optical system.

In employing this configuration, it is only necessary to register the position of the solid lens 11b according to the distance to the object to be read as a drive control parameter in the focus table and move the solid lens 11b to the position corresponding to the distance to the object to be read measured at Step S4 at the focus adjustment at Step S5 in FIG. 4.

Even in this configuration, the focus adjustment as in the case of using the liquid lens 11a is possible.

Further, as another modification, it is also conceivable to use a two-wavelength laser light generator including two light sources, one of which outputs visible light (for example, red light) and the other of which outputs invisible light (for example, infrared light) as the laser light generator 15.

In this case, the detection and the distance measurement of the object to be read can similarly be performed regardless of the wavelength of the laser light. Accordingly, it is preferable to configure the apparatus such that the user can use the apparatus by arbitrarily switching between two beams depending on whether it is better that the beam spot is visible (for the usage of aiming) or it is conversely better that the beam spot is invisible (for preventing user discomfort caused by the spot flickering visibly).

For example, it is conceivable to configure the code scanner such that in the case of using the code scanner hand-held, when the user operates a trigger while holding the scanner to the object to be read, the laser light generator 15 outputs the infrared light before triggering and outputs the red light after triggering.

A timing chart in this configuration, corresponding to that in FIG. 7, is illustrated in FIG. 14.

Also in this operation example, the feature that the CMOS image sensor 13 repeats pickup of an image in a unit of frame by free-running as illustrated by reference characters 51 and 52 in waveform (b) is the same as in FIG. 7.

In addition, before the user operates a trigger, the laser light generator outputs a pulse of the infrared light laser in each frame at the timing indicated by reference characters 54 and 55 in synchronization with the timing to open the shutter of the CMOS image sensor 13 as illustrated in waveform (c). Then, if the reflected light is incident on the CMOS image sensor 13, the detection of the object to be read and the distance measurement are possible as in the case of the above-described embodiment (an arrow 53).

Then, after the distance measurement is performed, the adjustments of the focus and the illumination light amount are performed if necessary as illustrated by 60 in waveform (f). However, until the trigger is operated, the CMOS image sensor 13 does not pick up an image for decoding but keeps waiting while adjusting the focus and the illumination light amount in each frame.

Then, upon detection that the user has operated a trigger as illustrated by 50 in waveform (a) through a predetermined signal, the CMOS image sensor 13 picks up an image for decoding from the next frame and decodes the code symbol. In this event, the outputted laser is switched to the red laser as indicated by 56 and 57 in waveform (d), thereby making it possible for the user to perform aiming using the spot of the red laser. When the timing to emit the red laser is in an interval between image pickup timings in frames by the CMOS image sensor 13, it is avoided that the spot of the red laser is included in the picked up image in each frame and that error sensing occurs when decoding.

On the other hand, when decoding has failed by the judgment at Step S8 in FIG. 4, the CPU 21 returns to Step 1 to perform initialization and the distance measurement again.

In this case, the red laser is emitted as indicated by 62 in waveform (d) in the frame for distance measurement (indicated by a reference character 61 in waveform (b) in FIG. 14), this time to perform distance measurement based on the reflection light of the red laser light, whereby the distance measurement can be performed while the user precisely aims the code scanner to the object to be read, resulting in increased probability of success of decoding using the image picked up again.

Further, as indicated by 63 in waveform (d), it is preferable to emit the red laser light in the interval between the image pickup timings in frames again after the distance measurement.

Then, as indicated by 60 in waveform (f), the focus position is adjusted based on the distance measurement result by the red laser light. The drawing illustrates the case where the focus adjustment amount is smoothly decreased.

Note that FIG. 4 illustrates the processing of returning the focus to the default state when the decoding has not succeeded within the reading effective time, whereas FIG. 14 illustrates the state that the processing is not performed. When the focus is once returned to the default state after a lapse of the reading effective time, the focus has been returned or is on the way to returning to the default state, at the point of time indicated by the reference character 61.

Further, the pulse LED 14 illuminates at the adjusted illumination light amount as indicated at 58 and 59 in waveform (e) when picking up an image for decoding. Further, since the focus has also been adjusted in advance using the infrared light laser, it is unnecessary to wait for a response time.

With the above configuration, the distance measurement and the focus adjustment are already completed before the user operates the trigger, so that reading can be performed without waiting for the time required for the distance measurement and the focus adjustment after the operation of the trigger, resulting in improved response.

Further, in addition to the above, it is also conceivable to switch the wavelength of the outputted laser light according to the operation by the user regardless of the instruction to start reading or to automatically switch the laser light to the visible light when the object to be read is detected so as to make it possible for the user to easily recognize the detection of the object to be read.

Further, though the example that the image forming optical system is composed of the focus lens 11 and the master lens 12 has been described in the above embodiment, it is of course possible to realize the optical system with desired characteristics by combining more lenses as long as the focal length of the whole optical system can be adjusted by any means.

Further, the optical information reader of the invention can also be configured as a stationary type apparatus and a hand-held type apparatus. This also applies to the optical information reading method.

Further, the above-described configurations and modifications are applicable also in combination to the extent not inconsistent with each other.

The optical information reader and an optical information reading method hereinbefore enables quick and precise reading of information indicated by a symbol different in light reflectance from surroundings arranged on an object to be read even if the distance to the object to be read and the moving speed of the object to be read are unknown.

The optical information reader and the optical information reading method hereinbefore are suitable for an optical information reader which reads out information on a code symbol attached to an article or on merchandise, in particular, an optical information reader such as a small-size inexpensive barcode scanner, for recognition of an article, document, material, specimen, and other various substances in a wide range of fields such as distribution, mail service, medical service, chemical experiment, and event site.

REFERENCE CHARACTER LIST

1: code scanner, 3: belt conveyor, 4: baggage, 5: code symbol, 10: optical module, 11: focus lens, 12: master lens, 13: CMOS image sensor, 14: pulse LED, 15: laser light generator, 20: decoder, 21: CPU, 22: ROM, 23: RAM

What is claimed is:

1. An optical information reader which reads a symbol and decodes information indicated thereby, comprising:
an output device that outputs measuring light directed at the symbol to be read, wherein said output device outputs a laser light as said light for sensing the object to be read and measuring distance to the object to be read;
an illuminator that illuminates the symbol to be read;
an image pickup device that picks up an image of the symbol to be read, comprising an image sensor with a plurality of light responsive pixels, the image pickup having a shutter function controlling the start and stop of accumulation of charge substantially simultaneously in all pixels in accordance with an amount of light received by pixels;
a first controller that, in a first mode of operation, performs control in a first mode of operation, when reading the symbol, instructs said image pickup device to start periodic image pickup by said image sensor while turning on the measuring light output by said output device;
a distance measurement device that analyzes the image picked up by said image pickup device in said first mode and, when measuring light reflected by the symbol is detected in the image, measuring the distance to the symbol based on the position of the measuring light in the image;
a second controller that sets the amount of illumination produced by said illuminator based on the distance to the symbol as measured by said distance measurement device;
a third controller that, in a second mode of operation, turns on said illuminator with the illumination amount set by said second controller and causes said image pickup device to perform periodic image pickup via said image sensor, after distance measurement device detects measuring light in the image; and
a decoder that analyzes the image picked up by said image pickup device in the second mode and decodes the information indicated by the symbol.

2. The optical information reader according to claim 1, wherein the symbol is different in light reflectance from its surroundings.

3. The optical information reader according to claim 1, wherein the pixels are formed in a matrix.

4. The optical information reader according to claim 1, wherein the measuring light has a wavelength, intensity and focus that make it distinguishable, by the image sensor, in the picked up image.

5. The optical information reader according to claim 1, wherein the measuring light is laser light.

6. The optical information reader according to claim 1, further comprising:
an optical system with adjustable focus included in said image pickup device;
a device that stores a focus table in which the distance to the symbol to be read is associated with the value of a predetermined parameter for adjusting the focus corresponding to the distance to the symbol; and
said second controller adjusting the focus by driving the optical system based on the value of the parameter acquired by searching the focus table making use of the distance measured by said distance measurement device.

7. The optical information reader according to claim 6, wherein the value of the parameter corresponding to the distance in a predetermined range around a focal depth when the focus is set to a predetermined initial value is a fixed value corresponding to the predetermined initial value in the focus table.

8. The optical information reader according to claim 1, said image pickup device further comprising a variable focus optical system forming an image of incident light on said image sensor and a device that adjusts focus of the optical system according to a value of a predetermined parameter, and
said second controller setting a value of the predetermined parameter for adjusting the focus of the optical system based on the distance to the symbol as measured by said distance measurement device.

9. The optical information reader according to claim 8, further comprising:
said optical system comprising a liquid lens the refractive power of which is adjustable by application of a voltage, and
wherein the focus is adjusted by adjusting the voltage applied to the liquid lens.

10. The optical information reader according to claim 1, further comprising:
a device that stores an illumination table in which the distance to the symbol is associated with a value of a drive control parameter for instructing said illuminator to perform illumination at an illumination amount suitable for the distance,
said second controller setting the illumination amount based on the value of the drive control parameter acquired by searching the illumination table making use of the distance measured by said distance measurement device.

11. The optical information reader according to claim 1, further comprising:
a device that outputs visible laser light and a device that outputs invisible laser light as said measuring light; and
a device that causes light output from said invisible laser device when there is no operation by a user, and switches to light output from said visible light laser device when there is a predetermined operation by the user.

12. The optical information reader according to claim 1, wherein, in said first mode, said image pickup device stops, after the start of the accumulation of charge in each pixel of said image sensor, the accumulation of charge in all pixels at a time when charge is at least equal to a predetermined reference value being accumulated in at least one of the pixels during a frame period.

13. The optical information reader according to claim 1, wherein, in the first mode, said distance measurement device analyzes the image picked up by said image pickup device in a frame period and measures a distance to the object to be read by start of a next frame period, and
said second controller setting the illumination amount of said illuminator by the start of a frame period following a frame period in which the measuring light is detected.

14. A method for reading optical information in which other information is encoded, comprising the steps of:
a. directing a measuring light source at the optical information, wherein the measuring light source provides both visible and invisible laser light, and wherein the measuring light source is controlled to output invisible laser light when there is no operation by a user, and when there is a predetermined operation by the user, controlling the measuring light source to output visible laser light;
b. directing an illumination light source at the optical information;
c. controlling an image pickup device that picks up an image of the optical information, the device comprising an image sensor with a plurality of light responsive pixels, the control being exercised so as to start and stop accumulation of charge substantially simultaneously in all pixels responsive to light incident on pixels, periodic image pickup by the image sensor being started during predetermined frame periods;

d. analyzing an image picked up by the image pickup device in step c. and, when measuring light reflected from the optical information is detected in the image, measuring the distance to the optical information based on the position of the measuring light in the image;

e. setting the amount of illumination light based on the distance measured in step d.;

f. tuning on the illumination light source at the illumination light amount set in step e. during periodic image pickup after measuring light is detected in step d.; and g. analyzing the image picked up by the image pickup device in step c. and decoding the other information.

15. The method according to claim 14 performed with an image pickup device in which the image sensor pixels are formed in a matrix.

16. The method according to claim 14 performed with a measuring light source in which the measuring light has a wavelength, intensity and focus that make it distinguishable, by the image sensor, in the picked up image.

17. The method according to claim 14 performed with a measuring light source which produces laser light.

18. The method according to claim 14, wherein at step e, the amount of illumination light is set based on a value of a drive control parameter acquired by making use of the distance measured in step d. to search an illumination table in which the distance to optical information is associated with the value of the drive control parameter.

19. The method according to claim 14, wherein step c. comprises instructing said image pickup device, after the start of the accumulation of charge in a charge accumulation element in each pixel of said image sensor, to stop the accumulation of charge in charge accumulation elements in all pixels at a time when charge at least equal to a predetermined reference value is accumulated in at least one of the charge accumulation elements in a frame period.

20. The method according to claim 14 performed with an image pickup device including an optical system and a device that adjusts focus of the optical system to form an image of incident light on said image sensor according to a value of a predetermined parameter, step e. comprising setting the value of the predetermined parameter based on the distance to the object to be read measured by said distance measured in step d.

21. The method according to claim 20, wherein setting the value comprises searching a focus table in which the distance to the optical information is associated with a value of the predetermined parameter, making use of the distance measured at step d. to perform the search.

22. The method according to claim 21, wherein, the value of the parameter corresponding to distance in a predetermined range around a focal depth when the focus is set to a predetermined initial value is a fixed value corresponding to a predetermined initial value in the focus table.

23. The method according to claim 20 performed with an optical system which comprises a liquid lens, the refractive power of which is adjustable by application of a voltage, the focus being adjusted by adjusting the voltage applied to the liquid lens.

24. The method according to claim 14, wherein
step d. comprises analyzing the image picked up by said image pickup device in each frame period and measuring the distance to the optical code by the start of the next frame period, and
step e. comprises setting the amount of illumination light by start of a frame period next following a frame period in which the measuring light is detected.

* * * * *